United States Patent
Takayama et al.

(10) Patent No.: US 8,059,184 B2
(45) Date of Patent: Nov. 15, 2011

(54) IMAGE DISPLAY APPARATUS

(75) Inventors: Tomohiko Takayama, Yokohama (JP);
Makoto Takagi, Yokohama (JP)

(73) Assignee: Canon Kabushiki Kaisha (JP)

( * ) Notice: Subject to any disclaimer, the term of this patent is extended or adjusted under 35 U.S.C. 154(b) by 1439 days.

(21) Appl. No.: 11/312,890

(22) Filed: Dec. 19, 2005

(65) Prior Publication Data

US 2006/0132381 A1    Jun. 22, 2006

(30) Foreign Application Priority Data

Dec. 20, 2004 (JP) .................................. 2004-367041

(51) Int. Cl.
*H04N 5/222* (2006.01)
(52) U.S. Cl. ...................................... 348/333.12; 348/46
(58) Field of Classification Search ........................ None
See application file for complete search history.

(56) References Cited

U.S. PATENT DOCUMENTS

| | | | |
|---|---|---|---|
| 5,416,510 A * | 5/1995 | Lipton et al. ..................... 348/43 |
| 5,523,886 A * | 6/1996 | Johnson-Williams et al. ............................ 359/464 |
| 5,654,752 A * | 8/1997 | Yamazaki .................. 348/208.8 |
| 6,154,133 A * | 11/2000 | Ross et al. ..................... 340/541 |
| 6,310,546 B1 * | 10/2001 | Seta ............................... 340/507 |
| 2004/0145655 A1 * | 7/2004 | Tomita ............................. 348/51 |
| 2004/0246576 A1 * | 12/2004 | Mogamiya ..................... 359/407 |
| 2005/0007662 A1 * | 1/2005 | Mogamiya ..................... 359/407 |
| 2006/0034487 A1 * | 2/2006 | Franz ............................. 382/104 |

FOREIGN PATENT DOCUMENTS

| EP | 1098217 | 10/2006 |
|---|---|---|
| JP | 2001-133725 | 5/2001 |
| WO | WO 2004068864 A1 * | 8/2004 |

OTHER PUBLICATIONS

Woods et al., "The Development of a Compact Underwater Stereoscopic Video Camera," SPIE Conference on Stereoscopic Displays and Applications VIII, San Jose, California, pp. 92-95, Feb. 1997.*

* cited by examiner

*Primary Examiner* — Lin Ye
*Assistant Examiner* — Dennis Hogue
(74) *Attorney, Agent, or Firm* — Rossi, Kimms & McDowell LLP

(57) ABSTRACT

Disclosed is an image display apparatus, including: a first image pickup unit; a second image pickup unit; a display unit for displaying a first image picked up by the first image pickup unit and a second image picked up by the second image pickup unit; a detecting portion for detecting conditions of the first and second image pickup units; and a display control portion for causing the display unit to display one of the first image and the second image based on a result obtained by the detecting portion.

13 Claims, 9 Drawing Sheets

IMAGE DISPLAY APPARATUS

BACKGROUND OF THE INVENTION

1. Field of the Invention

The present invention relates to an image display apparatus and is suitable for use in, for example, a head mounted image display apparatus.

2. Related Background Art

In recent years, mixed reality (MR) techniques have been known as techniques for seamlessly merging the real world with the virtual world in real time, that is, techniques capable of integrating the real world with the virtual world in real time with comfortable feeling to use the integrated world.

The following technique has been proposed as one of the MR techniques. According to this technique, a video see-through HMD (head mounted display) is used. An image of a subject substantially identical to a subject observed at an eye position of a person on whom the HMD is mounted is picked up by a video camera or the like. The picked up image is overlapped with computer graphics (CG) to display an overlapped image such that the person on whom the HMD is mounted can observe the overlapped image.

FIG. 6 is a structural view showing a conventional video see-through HMD. Because of a pair of structures for right and left eyes, a structure for only one of the eyes is shown in FIG. 6. The HMD includes a display device 201 composed of a small-size liquid crystal display for right eye or left eye and the like, a display optical system 202 such as a free-form curved surface prism for enlarging an image for right eye or left eye, which is displayed on the liquid crystal display, an image pickup device 301 for picking up an image of a subject substantially identical to an object (subject) observed at a position of an eye 401 of a person on whom the HMD is mounted, and an image pickup optical system 302 for substantially aligning the eye 401 of the person on whom the HMD is mounted with the image pickup device 301.

FIG. 7 is an external view showing a video see-through HMD 501 which is mounted on a person. FIG. 8 is a simple block diagram of the video see-through HMD 501. The video see-through HMD 501 includes image pickup units 510R and 510L for picking up images to be displayed in the HMD 501, an image processing unit 540 for performing image processing such as CG overlapping on the picked up images, and display units 520R and 520L for displaying composite images in which the picked up images are combined with the CG.

The image pickup unit 510R (510L) includes an image pickup device 511R (511L) such as a CCD image sensor or a CMOS image sensor, an AD conversion portion 512R (512L) for performing processings such as gain adjustment and correlated double sampling (CDS) on an analog signal outputted from the image pickup device 511R (511L) and then converting the processed analog signal into a digital signal, a digital signal processing portion 513R (513L) for performing processings such as gain control, color tint control, brightness control, and gamma correction on the digital signal, and a picked-up-image outputting portion 514R (514L) for outputting a picked-up-image signal to an outside.

The image processing unit 540 is composed of a personal computer, a workstation, or the like. The display unit 520R (520L) includes a display device 521R (521L) using polysilicon (p-Si) TFTs, liquid-crystal-on-silicon (LCOS), or the like, a display drive portion 522R (522L) for controlling and driving the display device 521R (521L), and a display image inputting portion 523R (523L) for receiving a display image signal inputted from an outside.

When the video see-through HMD having the above-mentioned structure is mounted on a person, the person can experience a mixed reality world in which the real world is seamlessly merged with the virtual world in real time (see Japanese Patent Application Laid-Open No. 2001-133725 (paragraphs 0026 to 0036 and FIG. 1) (corresponding to EP 1098217 A1)).

However, when a malfunction such as false operation or failure in an image pickup unit which is composed of a video camera and the like occurs in the conventional video see-through HMD, there is the following problem. That is, in such a case, an image is not outputted from the image pickup unit in which the malfunction occurs to display no image on a corresponding display unit, or an image in which noises and the like are generated is displayed on the display unit.

Warning or displaying corresponding to the malfunction of the image pickup unit is not performed. Of a plurality of image pickup units provided in the video see-through HMD, an image pickup unit in which the malfunction occurs cannot be determined. A trouble portion of the image pickup unit in which the malfunction occurs cannot also be determined. Therefore, it is impossible to smoothly deal with the malfunction up to now.

SUMMARY OF THE INVENTION

One of illustrative objects of the present invention is to provide an image display apparatus capable of performing preferable image displaying even when a malfunction such as a false operation or trouble, of an image pickup unit occurs.

An image display apparatus according to one aspect of the invention includes: a first image pickup unit; a second image pickup unit; a display unit for displaying a first image picked up by the first image pickup unit and a second image picked up by the second image pickup unit; a detecting portion for detecting conditions of the first and second image pickup units; and a display control portion for causing the display unit to display one of the first image and the second image based on a result obtained by the detecting portion.

An image display apparatus according to another aspect of the invention includes: a first image pickup unit; a second image pickup unit; a display unit for displaying images picked up by the first and second image pickup units; a detecting portion for detecting conditions of the first and second image pickup units; and an image processing portion for performing image processing on the images based on a result obtained by the detecting portion.

DETAILED DESCRIPTION OF THE PREFERRED EMBODIMENTS

Hereinafter, embodiments of the present invention will be described.

Embodiment 1

Figure 1:
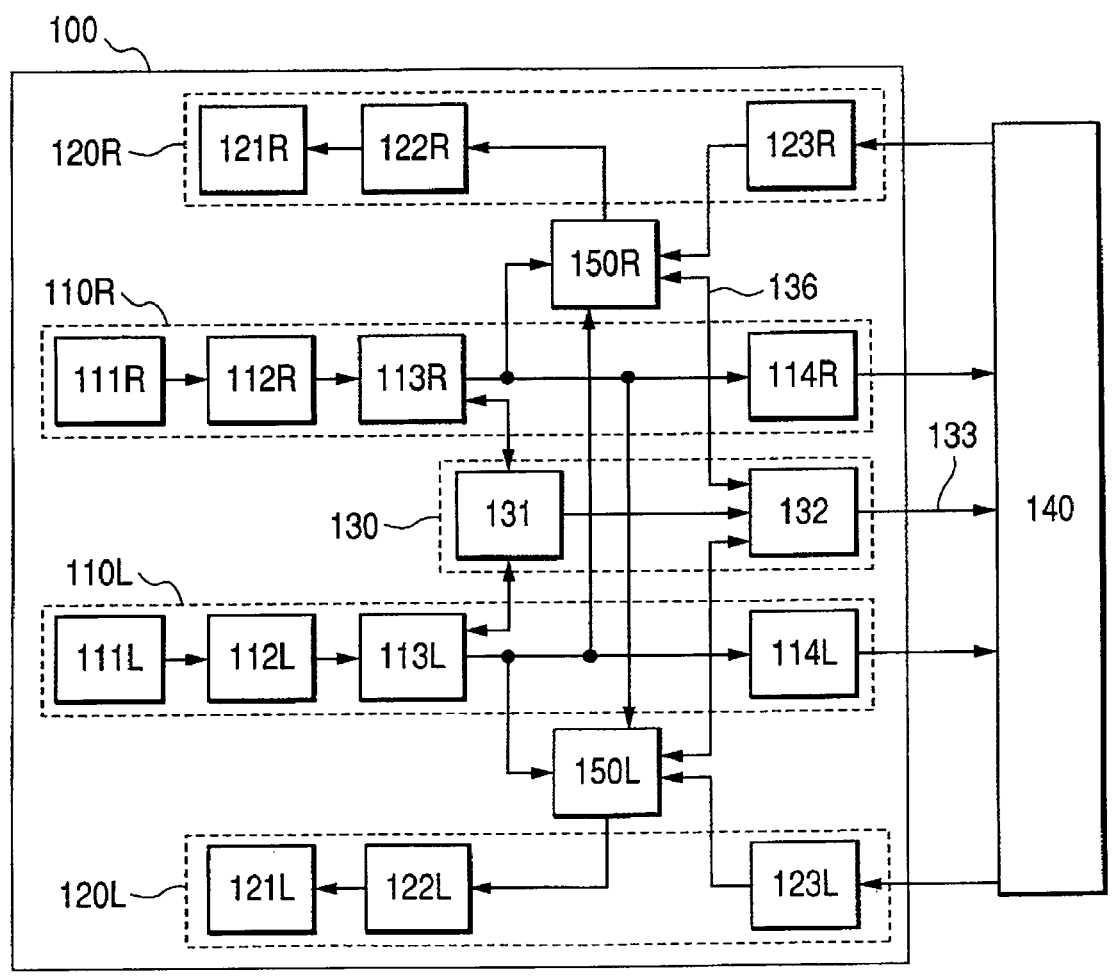
FIG. 1 is a structural block diagram showing an image display system to which a head mounted image display apparatus according to Embodiment 1 of the present invention is applied.

FIG. 1 is a structural block diagram showing an image display system using a head mounted image display apparatus (video see-through HMD) according to Embodiment 1 of the present invention.

A video see-through HMD 100 includes right and left image pickup units 110R and 110L, right and left display units 120R and 120L, an image processing unit (image processing portion) 140, right and left image signal selecting portions (display control portions) 150R and 150L, and a malfunction detecting unit (detecting portion) 130.

The image pickup unit 110R (110L) includes an image pickup device 111R (111L) such as a CCD image sensor or a CMOS image sensor, an AD conversion portion 112R (112L) for performing processings such as gain adjustment and correlated double sampling (CDS) on an analog signal outputted from the image pickup device 111R (111L) and then converting the processed analog signal into a digital signal, a digital signal processing portion 113R (113L) for performing processings such as gain control, color tint control, brightness control, and gamma correction on the digital signal, and a picked-up-image outputting portion 114R (114L) for converting a picked-up-image signal into an image format such as a USB format or an IEEE1394 format and outputting the converted signal to an external computer.

The display unit 120R (120L) includes a display device 121R (121L) using p-Si TFTs, a LCOS, or the like, a display drive portion 122R (122L) for controlling and driving the display device 121R (121L), and a display image inputting portion 123R (123L) for receiving an image format such as a DVI format, which is inputted from the external computer.

The malfunction detecting unit 130 includes a malfunction detecting portion 131 for detecting a malfunction of an image pickup unit, and a malfunction detection signal outputting portion 132 for outputting a malfunction detection signal 133 associated with a malfunction portion or the like to an outside when the malfunction is detected by the malfunction detecting portion 131. The malfunction detecting unit 130 is composed of, for example, a MPU.

The image processing unit 140 performs image processing such as CG overlapping on each of the picked-up-image signals from the picked-up-image outputting portions 114R and 114L of the video see-through HMD 100 and outputs display image data obtained after the image processing to the display image inputting portions 123R and 123L. The image processing unit 140 receives the malfunction detection signal 133 from the malfunction detection signal outputting portion 132. The image processing unit 140 may be composed of, for example, a general-purpose personal computer or a general-purpose workstation.

Next, image display processing in the video see-through HMD 100 according to this embodiment and the image display system will be described with reference to FIG. 2A.

First, the image pickup devices 111R and 111L of the respective image pickup units pick up images substantially identical to images of an object observed at eye positions of a person on whom the video see-through HMD 100 is mounted, that is, images shifted to each other by a base length between the right and left eye positions (S101).

Object images picked up by the image pickup devices 111R and 111L are inputted as analog signals to the AD conversion portions 112R and 112L. The object images are subjected to processings such as gain adjustment and correlated double sampling (CDS) and then converted into digital signals (S102).

Next, image pickup signals which are the digital signals obtained by the AD conversion portions are inputted to the digital signal processing portions 113R and 113L. The image pickup signals are subjected to processings such as gain control, color tint control, brightness control, and gamma correction to generate picked-up-image data (S103). The picked-up-image data are outputted to the image signal selecting portions (display control portions) 150R and 150L. The picked-up-image data are also outputted to the picked-up-image outputting portions 114R and 114L to output the data to the image processing unit 140.

The image signal selecting portion 150R determines whether the picked-up-image data outputted from the digital signal processing portion 113R is displayed on the display unit 120R (display image mode A) or the picked-up-image data which is obtained by image processing by the image processing unit 140 and outputted to the display image inputting portion 123R is displayed on the display unit 120R (display image mode B) based on a display image mode selected by the person on whom the video see-through HMD is mounted (S104) and then outputs any one of picked-up-image data to the display drive portion 122R (S105).

Similarly, the image signal selecting portion 150L outputs, to the display drive portion 122L, any one of picked-up-image data which are inputted from the digital signal processing portion 113L and the display image inputting portion 123L based on a selected display image mode.

In order to reduce a processing load, for example, in the case of the display image mode A, that is, in the case where the picked-up-image data outputted from the digital signal processing portions 113R and 113L are to be displayed on the display units 120R and 120L, respectively, it is possible to prevent the picked-up-image data from being outputted to the picked-up-image data outputting portions 114R and 114L in Step S103. In the case of the display image mode B, that is, in the case where the picked-up-image data which are obtained by image processing by the image processing unit 140 and outputted to the display image inputting portions 123R and 123L are to be displayed on the display units 120R and 120L, respectively, it is also possible to prevent the picked-up-image data from the digital signal processing portions from being outputted to the image signal selecting portions 150R and 150L in Step S103.

In Step S105, the picked-up-image data outputting portions 114R and 114L convert the picked-up-image data into image formats such as USB formats or IEEE1394 formats and then output the picked-up-image data to the image processing unit 140. The image processing unit 140 performs image processing such as CG overlapping on the picked-up-image data. The picked-up-image data obtained after the image processing are outputted to the display image inputting portions 123R and 123L and inputted to the image signal selecting portions 150R and 150L.

Then, in the case of the display image mode A, in which the picked-up-image data inputted from the digital signal processing portions 113R and 113L are selected by the image signal selecting portions 150R and 150L, the images picked up by the image pickup devices 111R and 111L are directly displayed on the display devices 121R and 121L (S108).

In the case of the display image mode B, in which the picked-up-image data inputted from the display image inputting portions 123R and 123L are selected by the image signal selecting portions 150R and 150L, the images obtained by performing image processing on the picked-up-image data generated through the image pickup devices 111R and 111L by the image processing unit 140 are displayed on the display devices 121R and 121L (S108). Therefore, each of the image signal selecting portions 150R and 150L serves as a selector for selecting one from inputted two image signals to output the selected image signal. When the display image mode selection is not performed, the display image mode B, in which the picked-up-image data inputted from the display image inputting portions 123R and 123L are selected is set.

Next, processing in the head mounted image display apparatus according to this embodiment and the image display system in the case where a malfunction occurs in either of the image pickup units 110R and 110L will be described with reference to FIGS. 2A and 2B. FIG. 2B is a block diagram showing a processing flow in the case where a malfunction occurs in the image pickup unit 110L.

Figure 2A:
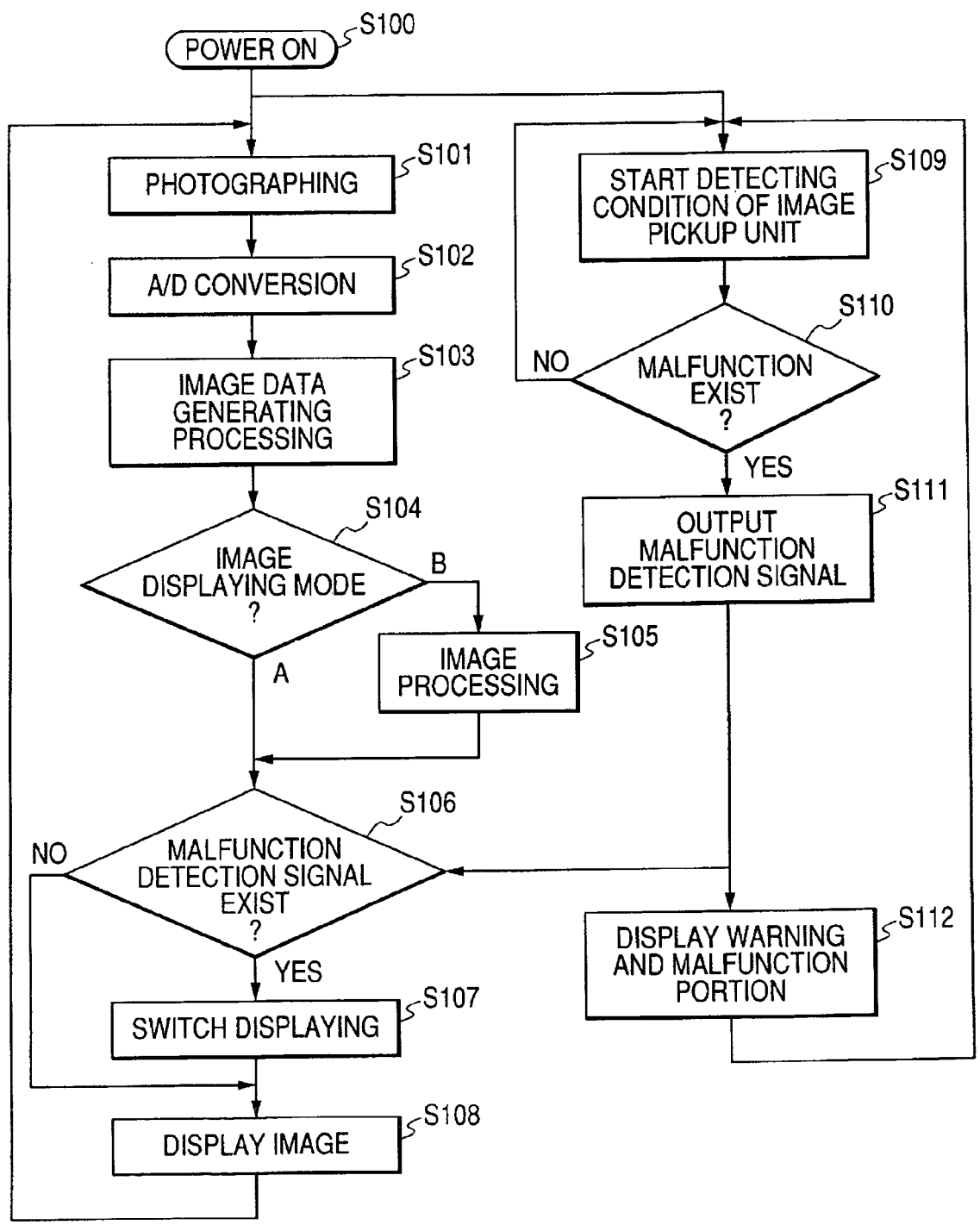
FIG. 2A is an operational flow chart of the image display system to which the head mounted image display apparatus according to Embodiment 1 of the present invention is applied and FIG. 2B is a block diagram showing a processing transition in the case where a malfunction occurs in an image pickup unit in Embodiment 1 of the present invention.
Figure 2B:
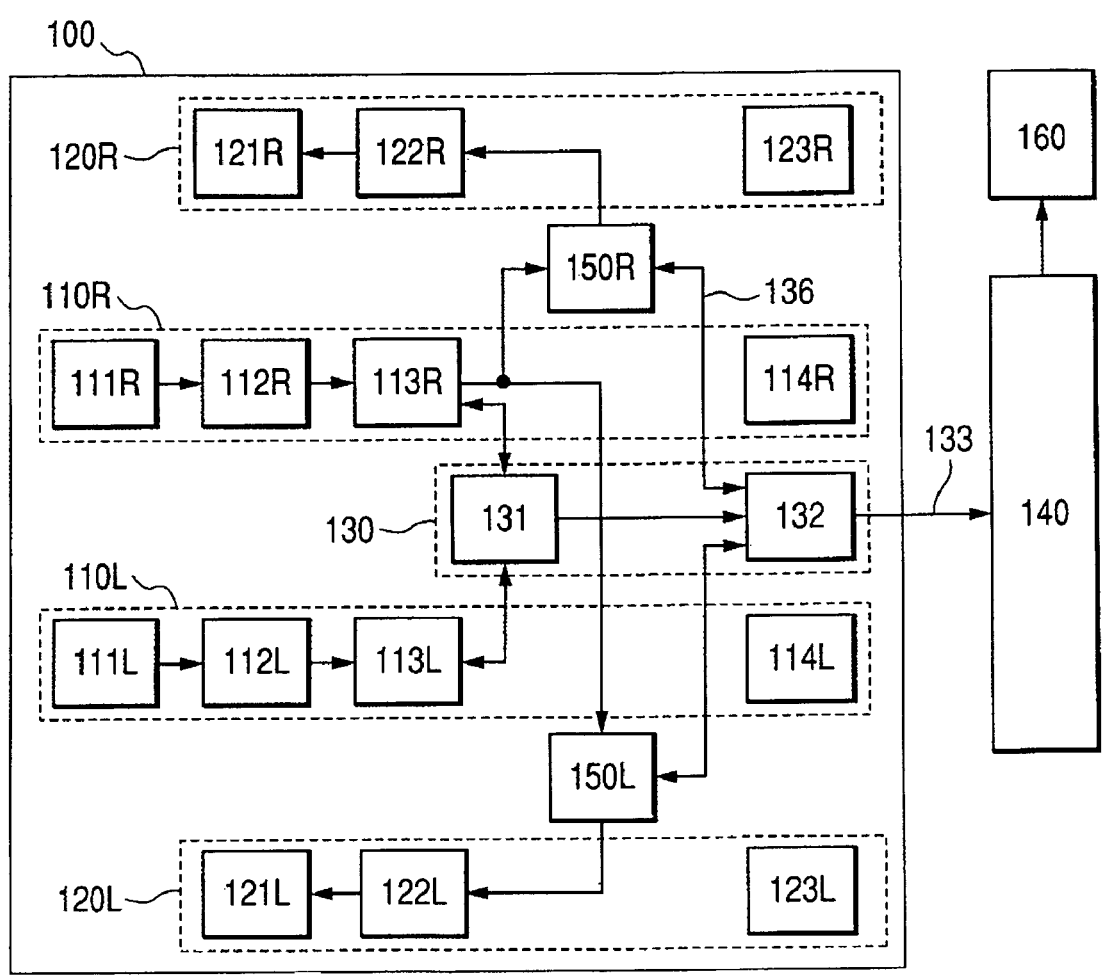

In FIG. 2A, when a power supply is turned ON (S100), a photographing operation of each of the image pickup units 110R and 110L starts (S101) and condition detection processing to which the image pickup units 110R and 110L are subjected by the malfunction detecting unit 130 starts (S109). More specifically, the malfunction detecting portion 131 continuously monitors power supply lines of the image pickup units 110R and 110L. In addition, the malfunction detecting portion 131 continuously detects signals such as the image pickup signals, horizontal synchronization signals, vertical synchronization signals, pixel clock signals, and enable signals, which are outputted from the image pickup devices 111R and 111L. For example, the malfunction detecting portion 131 monitors the digital signal processing portions 113R and 113L to detect a malfunction in which signals are not inputted from the image pickup devices 111R and 111L for a predetermined time period or more or a malfunction in which a voltage variation range of one of the power supply lines becomes outside a standard range (S110). In this embodiment, when a level value of each of the signals is equal to or larger than a predetermined value or smaller than the predetermined value, the malfunction detecting portion 131 determines that a malfunction occurs in one of the image pickup units 110R and 110L. Even when the respective signals are not inputted, the malfunction detecting portion 131 determines that the malfunction occurs in one of the image pickup units 110R and 110L.

When the malfunction detecting portion 131 detects the malfunction, the malfunction detection signal 133 is outputted from the malfunction detection signal outputting portion 132 to the image processing unit 140. A display switching control signal 136 is outputted from the malfunction detecting unit 130 to each of the image signal selecting portions 150R and 150L (S111). FIG. 2B shows that the display switching control signal 136 is outputted from the malfunction detection signal outputting portion 132. The display switching control signal 136 may be outputted from the image processing unit 140 which receives the malfunction detection signal 133 from the malfunction detection signal outputting portion 132.

Figure 3:
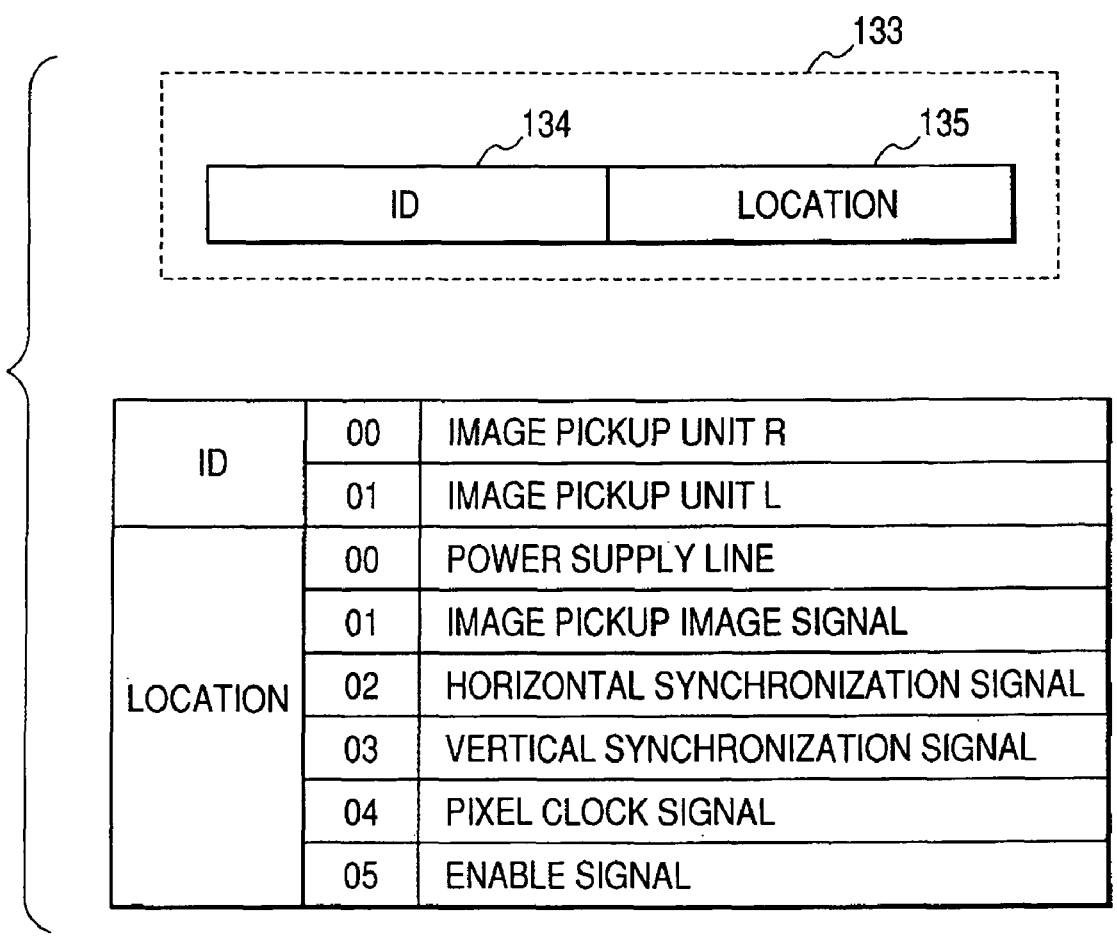
FIG. 3 shows a malfunction detection signal in Embodiment 1 of the present invention.

Here, the malfunction detection signal 133 will be described in detail. FIG. 3 shows an example of a data format of the malfunction detection signal 133. The malfunction detection signal 133 is composed of an identification ID 134 identifying the image pickup unit 110R or 110L whose malfunction is detected and LOCATION 135 identifying a location in which the malfunction is detected. When the malfunction is detected in the image pickup unit 110R, for example, "00" is set as the identification ID 134. When the malfunction is detected in the image pickup unit 110L, for example, "01" is set as the identification ID 134.

When a malfunction is detected in a power supply line, for example, "00" is set as the LOCATION 135. When a malfunction is detected in an image pickup signal, for example, "01" is set as the LOCATION 135. An interface such as a serial interface or an I2C interface can be used to communicate the malfunction detection signal 133 to the image processing unit 140.

When the malfunction detecting portion 131 of the malfunction detecting unit 130 detects the malfunction of the image pickup unit 110R (110L), the identification ID 134 for the image pickup unit 110R (110L) is detected as an identification signal for the image pickup unit 110R (110L). Among the image pickup device 111R, the AD conversion portion 112R, and the digital signal processing portion 113R in the image pickup unit 110R, a portion in which a malfunction occurs in a signal therefrom is determined to obtain LOCATION information. The identification signal and the LOCATION information are outputted to the malfunction detection signal outputting portion 132. The malfunction detection signal 133 as shown in FIG. 3 is generated by the malfunction detection signal outputting portion 132.

The image signal selecting portions 150R which receives the display switching control signal 136 performs a display switching operation so as to output the picked-up-image data from the digital signal processing portion 113R to the display drive portion 122R. The image signal selecting portions 150L which receives the display switching control signal 136 performs a display switching operation so as to output not the picked-up-image data from the digital signal processing portion 113L of the image pickup unit 110L in which the malfunction occurs but the picked-up-image data from the digital signal processing portion 113R to the display drive portion 122L (S106 and S107).

The image processing unit 140 which receives the malfunction detection signal 133 determines a malfunctioned portion based on, for example, the identification ID 134 for the image pickup unit which is in a malfunction condition and the LOCATION 135 identifying a malfunction location. For warning, a beep sound is generated or a warning message is displayed on an external monitor or the like. A malfunction warning unit 160 for causing an external LED to emit light can be used to provide a notice of the malfunctioned portion to a person on whom the video see-through HMD is mounted or a third person (S112).

As described above, in this embodiment, the conditions of the image pickup units 110R and 110L are continuously monitored by the malfunction detecting unit 130. The picked-up-image data picked up by one of the image pickup units 110R and 110L is displayed on each of the display units 120R and 120L based on the conditions.

In other words, switching is performed between a first mode and a second mode in response to the malfunction detection signal 133. In the first mode, one of first image data picked up by the image pickup unit 110R and second image data picked up by the image pickup unit 110L is displayed on each of the display units 120R and 120L. In the second mode, the first image data and the second image data are displayed on the display units 120R and 120L, respectively.

Therefore, even when the malfunction occurs in the image pickup unit 110L, the display operation is immediately switched so as to display the image picked up by the image pickup device 111R on each of the display devices 121R and 121L. As a result, unlike a conventional case, it is prevented that no image is displayed on the display unit or a noise image is displayed thereon. Thus, a preferable image can be displayed, with the result that the person on whom the video see-through HMD is mounted can maintain normal visibility.

The outputted malfunction detection signal 133 includes the identification information for the image pickup unit 110R or 110L and the LOCATION information identifying the location in which the malfunction occurs. Therefore, the malfunctioned portion can be determined, so that it is possible to easily perform a maintenance operation.

Embodiment 2

Figure 4A:
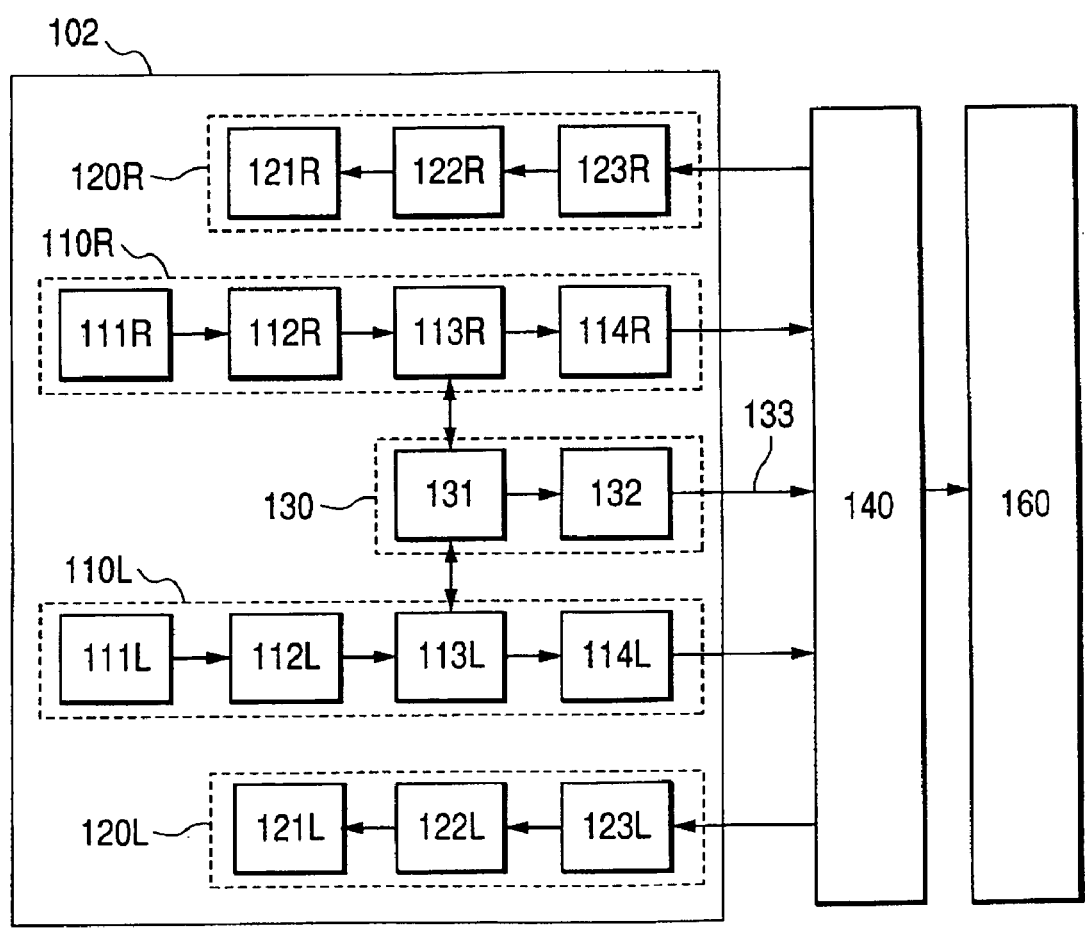
FIG. 4A is a structural block diagram showing an image display system to which a head mounted image display apparatus according to Embodiment 2 of the present invention is applied and FIG. 4B is an operational flow chart of the image display system to which the head mounted image display apparatus according to Embodiment 2 of the present invention is applied.

FIG. 4A is a structural block diagram showing an image display system using a head mounted image display apparatus according to Embodiment 2 of the present invention. According to the image display system in this embodiment, typically, the picked-up-image data are outputted to the image processing unit 140, and subjected to image processing for overlapping the picked-up-image data with the CG and allowed to be performed 3D-displaying. Then, the processed data are displayed on the display units 120R and 120L. In other structures, the same reference symbols are provided for the same components as those shown in FIG. 1 in Embodiment 1 and thus the descriptions are omitted here.

Image display processing in the head mounted image display apparatus according to this embodiment and the image display system will be described with reference to FIG. 4B.

First, the image pickup devices 111R and 111L of the respective image pickup units pick up images substantially identical to images of an object observed at eye positions of a person on whom the video see-through HMD is mounted, that is, images shifted to each other by a base length between the right and left eye positions (S301).

Object images picked up by the image pickup devices 111R and 111L are inputted as analog signals to the AD conversion portions 112R and 112L. The object images are subjected to processings such as gain adjustment and correlated double sampling (CDS) and then converted into digital signals (S302).

Next, image pickup signals which are the digital signals obtained by the AD conversion portions are inputted to the digital signal processing portions 113R and 113L. The image pickup signals are subjected to processings such as gain control, color tint control, brightness control, and gamma correction to generate picked-up-image data (S303). The picked-up-image data are outputted to the picked-up-image outputting portions 114R and 114L to output the data to the image processing unit 140.

The image processing unit 140 performs image processing such as CG overlapping on each of the picked-up-image data (S304). The picked-up-image data obtained after the image processing are inputted to the display image inputting portions 123R and 123L. Then, picked-up-image data are outputted to the display devices 121R and 121L through the display drive portions 122R and 122L. The images obtained by the image processing unit 140 are displayed on the display devices 121R and 121L.

Next, processing in the head mounted image display apparatus according to this embodiment and the image display system in the case where a malfunction occurs in any of the image pickup units 110R and 110L will be described with reference to FIG. 4B. Here, the case where the malfunction occurs in the image pickup unit 110L will be described and the description in the case where the malfunction occurs in the image pickup unit 110R is omitted.

Figure 4B:
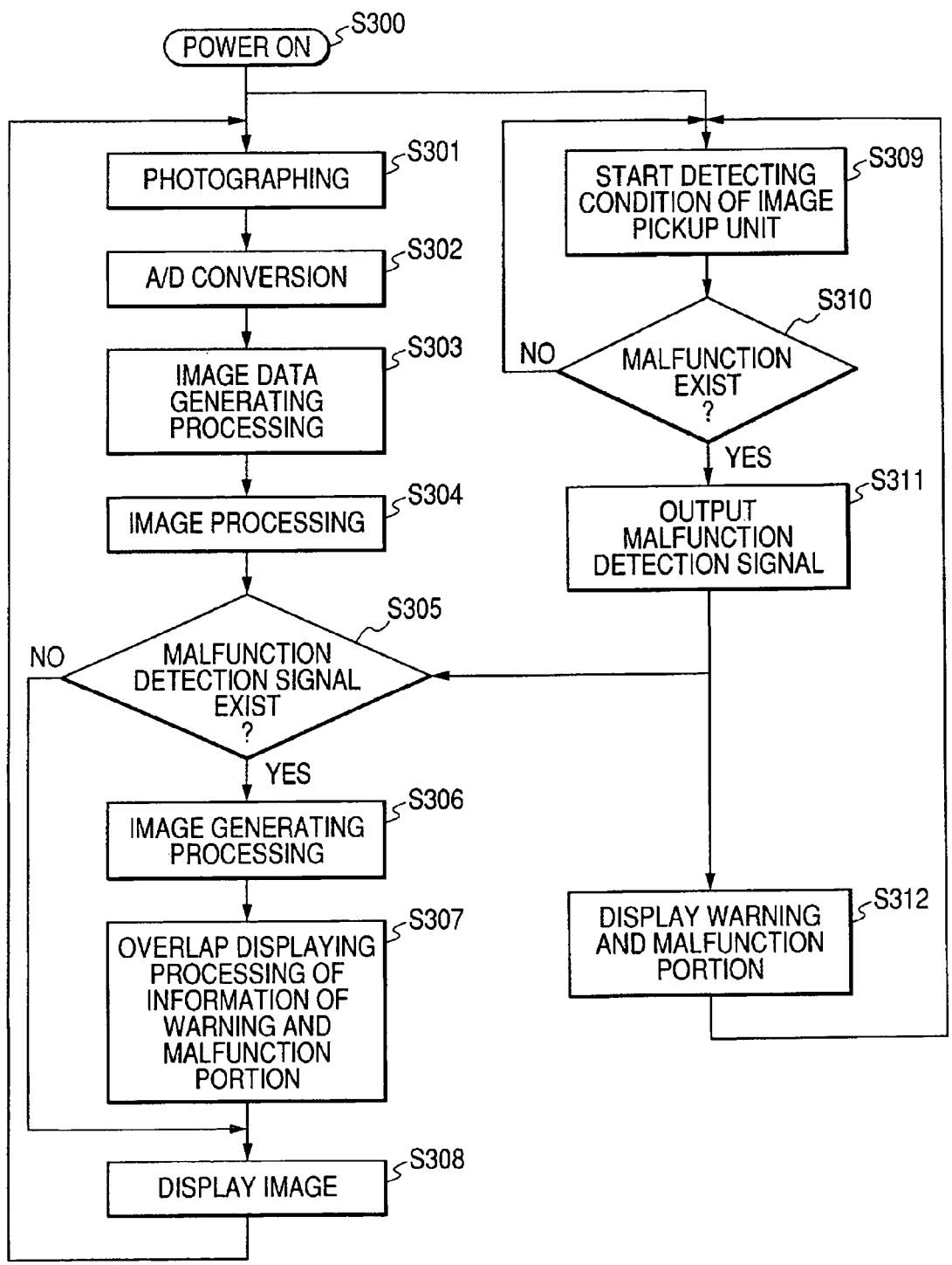

In FIG. 4B, when a power supply is turned ON (S300), a photographing operation of each of the image pickup units 110R and 110L starts (S301) and condition detection processing to which the image pickup units 110R and 110L are subjected by the malfunction detecting unit 130 starts (S309). As in Embodiment 1, the malfunction detecting portion 131 continuously monitors the power supply lines of the image pickup units 110R and 110L. In addition, the malfunction detecting portion 131 continuously detects the signals such as the image pickup signals, the horizontal synchronization signals, the vertical synchronization signals, the pixel clock signals, and the enable signals, which are outputted from the image pickup devices 111R and 111L.

When the malfunction detecting portion 131 detects the malfunction (S310), the malfunction detection signal 133 is outputted from the malfunction detection signal outputting portion 132 to the image processing unit 140 (S311). The malfunction detection signal 133 and the details thereof are identical to those shown in FIG. 3.

The image processing unit 140 which receives the malfunction detection signal 133 can determine the image pickup unit 110L in which the malfunction occurs and a malfunctioned portion thereof based on, for example, the identification ID 134 for the image pickup unit which is in a malfunction condition and the LOCATION 135 identifying a malfunction location (S305).

Here, in this embodiment, the image processing unit 140 generates picked-up-image data substantially identical to the picked-up-image data which may be picked up by the image pickup unit 110L in which the malfunction occurs based on the picked-up-image data outputted from the image pickup unit 110R which is normally operating. In other words, shift image data is generated by suitably shifting the picked-up-image data outputted from the picked-up-image outputting portion 114R based on the right-and-left parallax of the person on whom the video see-through HMD is mounted.

Then, the picked-up-image data generated by the image pickup unit 110R and the shift image data generated based on the picked-up-image data generated by the image pickup unit 110R are subjected to CG overlap processing. The processed respective image data are outputted to the corresponding display units 120R and 120L and displayed thereon.

In this embodiment, the malfunction detection signal 133 is received by the image processing unit 140. Therefore, during the image processing performed by the image processing unit 140, the picked-up-image data is overlapped with malfunction detection information such as a warning message and the malfunctioned portion based on the malfunction detection signal 133 and an overlapped image is displayed. Thus, the person on whom the video see-through HMD is mounted can immediately recognize that the malfunction occurs.

As in Embodiment 1, the malfunction warning unit 160 for generating a notice indicating that the malfunction occurs can be provided for a combination with the malfunction detection information displayed on each of the display units 120R and 120L.

Figure 5:
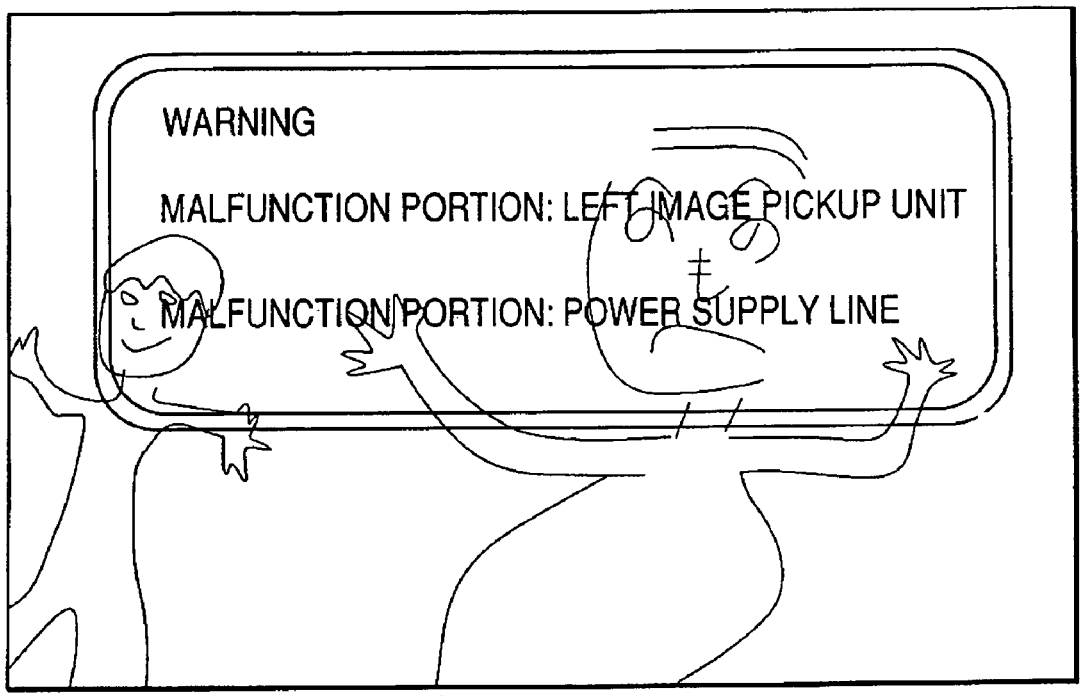
FIG. 5 shows an image overlapped with malfunction detection information, which is displayed on the head mounted image display apparatus according to Embodiment 2 of the present invention.
Figure 6:
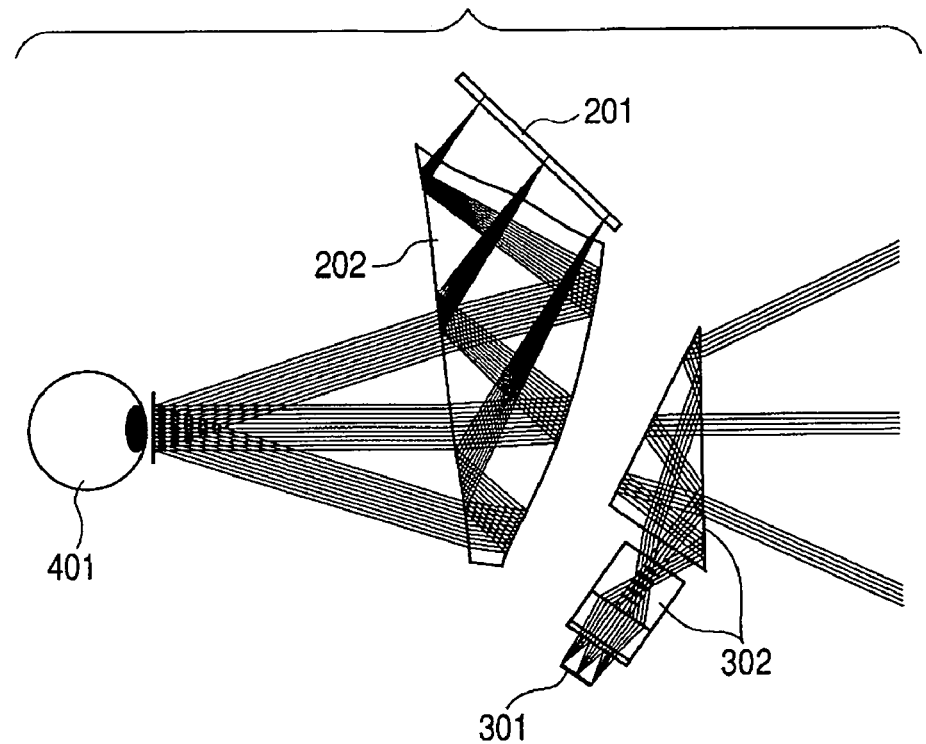
FIG. 6 is a structural view showing a conventional head mounted image display apparatus.
Figure 7:
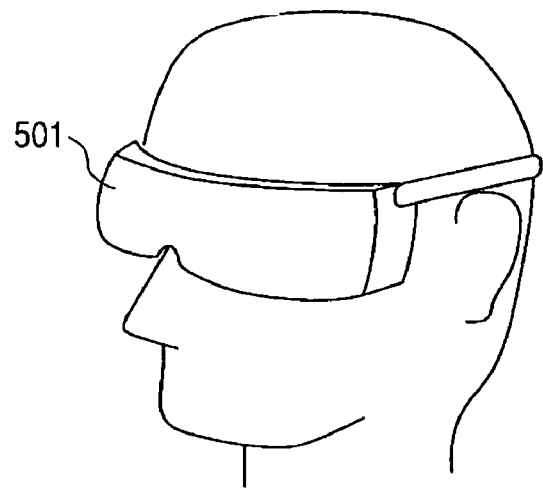
FIG. 7 is an external view showing the conventional head mounted image display apparatus which is mounted.
Figure 8:
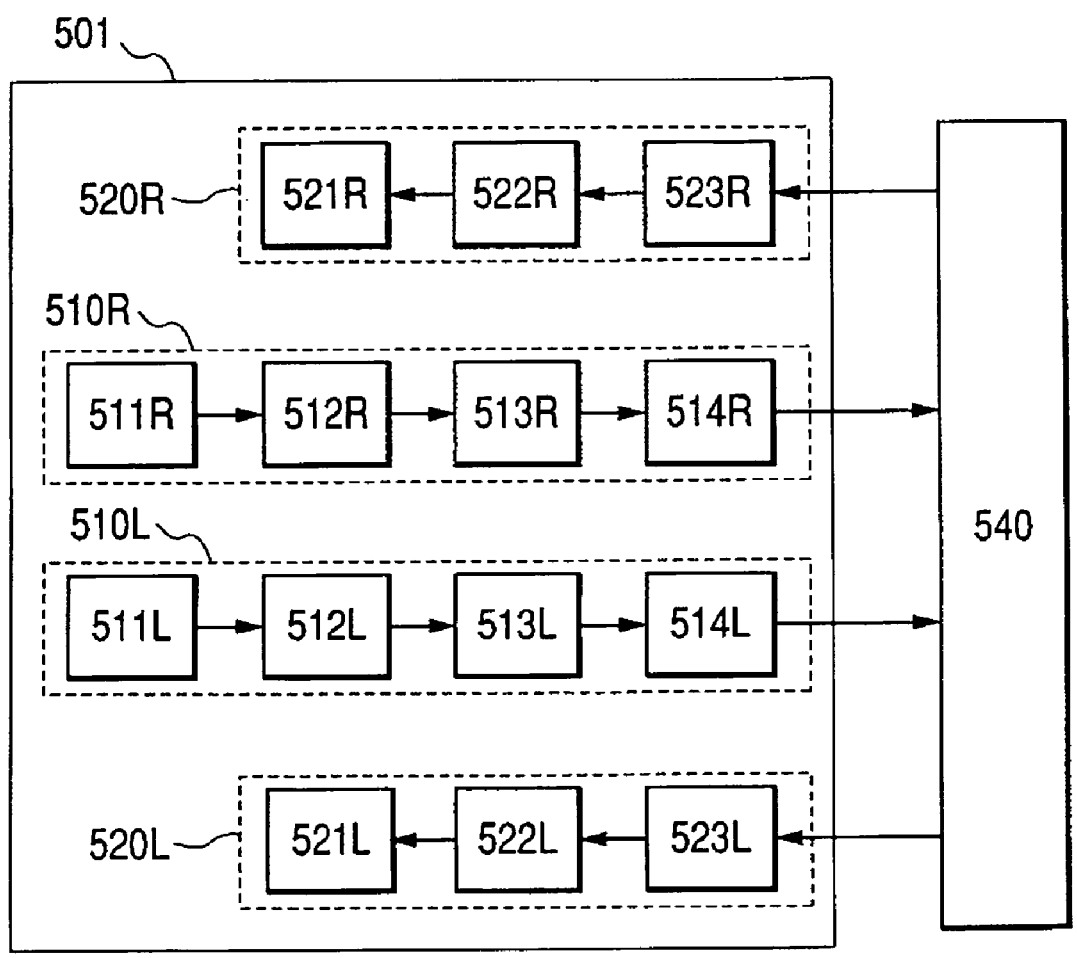
FIG. 8 is a structural block diagram showing the conventional head mounted image display apparatus.

FIG. 5 shows the picked-up-image data overlapped with the warning message, which is displayed on each of the display units 120R and 120L. FIG. 5 shows the case where the ID 134 identifying the image pickup unit in which the malfunction is detected indicates the image pickup unit 110L and the LOCATION 135 identifying the location in which the malfunction is detected indicates the power supply line. A display content of the warning message, a display position thereof, a warning message display method, and the like are not limited to those shown in FIG. 5 and thus may be those in which the person on whom the video see-through HMD is mounted can recognize that the malfunction occurs in either of the image pickup units 110R and 110L.

As described above, in this embodiment, even when the malfunction occurs in the image pickup unit 110L, it is possible to observe a 3D-image similar to an image which is being displayed before the malfunction occurs. In addition, when the picked-up-image data is subjected to image processing such as the warning message overlapping, the person on whom the video see-through HMD is mounted can immediately recognize that the malfunction occurs in either of the image pickup units.

In other words, the image processing for overlapping the picked-up-image data with the malfunction detection information is performed in response to the malfunction detection signal 133. Then, the picked-up-image data (third image) substantially identical to the picked-up-image data (second image) which may be picked up by the image pickup unit 110L is generated based on the picked-up-image data (first image) picked up by the image pickup unit 110R.

Therefore, the picked-up-image data is overlapped with the warning message for providing the notice indicating that the malfunction occurs in the image pickup unit and the overlapped image is displayed, so that the person on whom the video see-through HMD is mounted can immediately recognize that the occurrence of malfunction and the malfunctioned portion. In addition, when a parallax image is generated from an image picked up by the image pickup unit which is normally operating, the 3D-image similar to the image which is being displayed before the malfunction occurs can be provided. Thus, it is possible to overlap the image picked up by the image pickup unit which is normally operating with the CG and display the overlapped image as in the case of overlapping and displaying before the malfunction occurs.

As in Embodiment 1, for example, the image processing for overlapping the picked-up-image data outputted from the image pickup unit 110R which is normally operating with the CG is performed and the picked-up-image data obtained by the image processing is outputted to each of the display image inputting portions 123R and 123L. That is, the picked-up-image data from the image pickup unit 110R which is normally operating can be outputted to each of the display units 120R and 120L without performing image processing on the picked-up-image data outputted from the image pickup unit 110L in which the malfunction occurs. In addition, it is possible to perform the image processing for overlapping the picked-up-image data with the warning message.

In this embodiment, in response to the malfunction detection signal 133, the image processing unit 140 switches between the mode for displaying the images picked up by both the image pickup units 110R and 110L on the corresponding display units 120R and 120L and the mode for displaying the picked-up-image data outputted from the image pickup unit which is normally operating and the picked-up-image data substantially identical to the picked-up-image data which may be picked up by the image pickup unit in which the malfunction occurs on the corresponding display units 120R and 120L.

In the image display system described in each of Embodiments 1 and 2, the image processing unit 140 is separated from each of the video see-through HMDs 100 and 102. However, each of the video see-through HMDs 100 and 102 can be integrally provided with the image processing unit 140.

In Embodiment 1, the malfunction warning unit 160 is provided to generate the notice indicating the malfunction of one of the image pickup unit 110R and 110L. When the malfunction occurs as in Embodiment 2, the image processing can be performed so as to display the malfunction detection information on each of the display units 120R and 120L.

It is possible that a display device for displaying the malfunction detection information be provided in a portion of a display area of each of the display units 120R and 120L and the picked-up-image data be displayed without overlapping with the malfunction detection signal in response to the malfunction detection signal 133 generated when the malfunction occurs in one of the image pickup units 110R and 110L. It is also possible that the display units 120R and 120L be integrated as a single display unit and the respective picked-up-image data be displayed on a first display area corresponding the image pickup unit 110R and a second display area corresponding to the image pickup unit 110L, which compose a display area of the single display unit.

In Embodiments 1 and 2, the display operation switching of each of the image signal selecting portions 150R and 150L is performed in response to the outputted display switching control signal 136. However, for example, the image signal selecting portions 150R and 150L and the malfunction detecting unit 130 can be composed of the same field programmable gate array (FPGA) to provide a circuit structure for automatically performing the malfunction detection of the malfunction detecting portion 131 and the display switching control of each of the image signal selecting portions 150R and 150L.

The example is described in which the malfunction detection signal 133 includes the identification ID 134 identifying the image pickup unit whose malfunction is detected and the LOCATION 135 identifying the location in which the malfunction is detected. It is desirable to use a suitable signal format as appropriate corresponding to an interface or the video see-through HMD. For example, the ID 134 can be set for the image pickup devices 111R and 111L, the AD conversion portions 112R and 112L, the digital signal processing portions 113R and 113L, and the picked-up-image outputting portions 114R and 114L, which compose the image pickup units.

This application claims priority from Japanese Patent Application No. 2004-367041 filed on Dec. 20, 2004, which is hereby incorporated by reference herein.

What is claimed is:

1. An image display apparatus, comprising:
a first image pickup unit;
a second image pickup unit;
a display unit, including a first display unit and a second display unit, for displaying a first image picked up by the first image pickup unit on the first display unit and a second image picked up by the second image pickup unit on the second display unit;
a detecting portion for detecting malfunctions of the first and second image pickup units; and
a display control portion for displaying the first image on the first display unit and a parallax-shifted first image on the second display unit if malfunction of the second image pickup unit is detected by the detecting portion, and displaying a parallax-shifted second image on the first display unit and the second image on the second display unit if malfunction of the first pickup unit is detected by the detecting portion.

2. An image display apparatus according to claim 1, wherein
in accordance with the result obtained by the detecting portion, said display control portion switches between a first mode for displaying one of the first image and the second image on the display unit and a second mode for displaying the first image and the second image on the display unit.

3. An image display apparatus according to claim 1, wherein
said detecting portion outputs a malfunction detection signal in accordance with the malfunctions of the first and second image pickup units.

4. An image display apparatus according to claim 1, wherein
said detecting portion detects the malfunctions of said first and second image pickup units in accordance with output signals including image pickup signals, which are outputted from the first and second image pickup units.

5. An image display apparatus according to claim 4, wherein
the detecting portion detects identification information of the first and second image pickup units.

6. An image display apparatus, comprising:
a first image pickup unit;
a second image pickup unit;
a display unit, including a first display unit and a second display unit, for displaying images picked up by the first image pickup unit on the first display unit, and images picked up by the second image pickup unit on the second display unit;
a detecting portion for detecting malfunctions of the first and second image pickup units; and
an image processing portion for performing image processing on the images on the display unit if malfunction of at least one of the first and second image pickup units is detected by the detecting portion, such that the images picked up by the first image pickup unit are displayed on the first display unit and parallax-shifted images picked up by the first image pickup unit are displayed on the second display unit if a malfunction of the second image pickup unit is detected by the detecting portion, and parallax-shifted images picked up by the second image pickup unit are displayed on the first display unit and the images picked up by the second image pickup are displayed on the second display unit if a malfunction of the first pickup unit is detected by the detecting portion.

7. An image display apparatus according to claim 6, wherein
the image processing portion generates an image different from a first image picked up by one of the first and second image pickup units based on the first image.

8. An image display apparatus according to claim 7, wherein
the image processing portion switches between a first mode for displaying the first image and a second image picked up by the other of the first and second image pickup units on the display unit and a second mode for displaying one of the first image and the second image and said image different from the first image on the display unit.

9. An image display apparatus according to claim 7, wherein
said image different from the first image is a third image substantially identical to the second image picked up by the other of the first and second image pickup units.

10. An image display apparatus according to claim 6, wherein
said image processing portion performs processing for overlapping the images with condition detection information in accordance with a condition detection signal outputted from the detecting portion based on the conditions of the first and second image pickup units.

11. An image display apparatus according to claim 6, wherein
said detecting portion outputs a condition detection signal in accordance with the malfunctions of the first and second image pickup units.

12. An image display apparatus according to claim 6, wherein
said detecting portion detects malfunctions of said first and second image pickup units in accordance with output signals including image pickup signals, which are outputted from the first and second image pickup units.

13. An image display apparatus according to claim 12, wherein
said detecting portion detects identification information of said first and second image pickup units.

\* \* \* \* \*